UNITED STATES PATENT OFFICE.

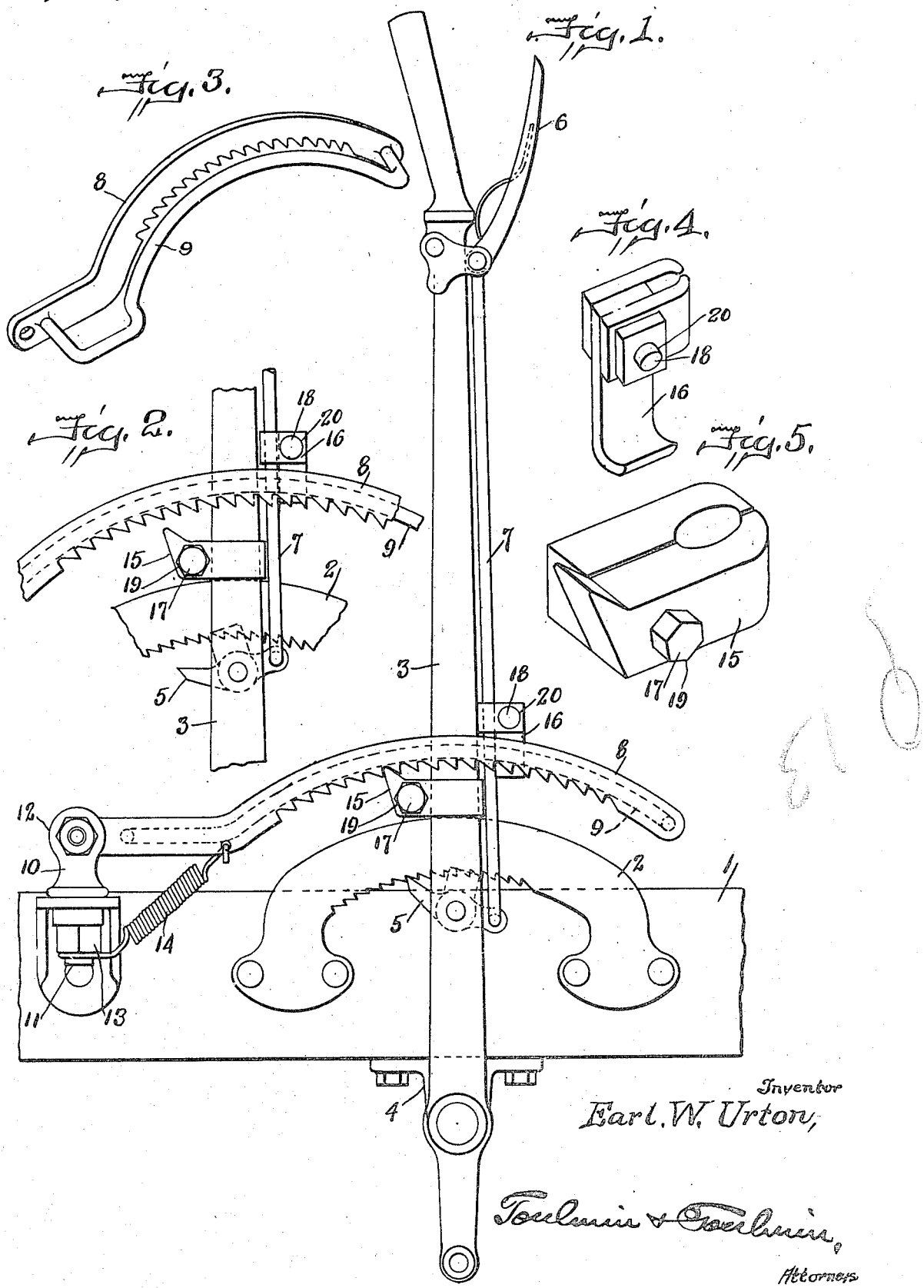

EARL W. URTON, OF DAYTON, OHIO, ASSIGNOR TO CHARLES E. BOWMAN, OF DAYTON, OHIO.

BRAKE MECHANISM.

1,323,661.   Specification of Letters Patent.   Patented Dec. 2, 1919.

Application filed July 28, 1919. Serial No. 313,805.

*To all whom it may concern:*

Be it known that I, EARL W. URTON, a citizen of the United States, residing at Dayton, in the county of Montgomery and State of Ohio, have invented certain new and useful Improvements in Brake Mechanisms, of which the following is a specification, reference being had therein to the accompanying drawing.

This invention relates to brake mechanism and in the form here shown relates particularly to emergency brakes for motor vehicles. The invention, however, is capable of general use in connection with various type of vehicles and is therefore not limited to the details of construction and operation shown.

In the present form of the invention the brake is used in combination with the standard brake of a Ford automobile constituting an auxiliary safety brake and tending to overcome certain well known faults of the brakes with which Ford cars are regularly equipped.

It is quite a common experience in the operation of Ford cars to have the emergency brake release when the car is standing at rest and the engine is running the vibration of the engine or jarring of the brakes as may result from persons entering or leaving the car causing the brakes to release accidentally, and thus cause accidents of more or less serious nature. Such accidents also frequently occur due to the releasing of the emergency brake when the engine is cranked with the result that the brake will move forward and throw the clutch into high gear and, with the starting of the engine, the car will plunge forward and collide with the operator. As is well known serious personal injuries are frequently sustained in accidents of this character, as well as damage being done to the automobile.

Failure of the brakes under various conditions, as above indicated, is due to two causes. First, the brake ratchets in normal condition are too fine or shallow, giving the ratchet latch insufficient holding contact therewith and making the brake too sensitive to incidental jars or shocks which may cause accidental releasing of the brakes. And second, the ratchet teeth and latch soon wear sufficiently to further render the brakes unreliable in this respect.

To correct these conditions, therefore, the present invention is employed in the particular application thereof here shown, as an auxiliary safety brake which makes the operation of the brakes safe and dependable under all conditions.

Furthermore in the form here shown the auxiliary safety brake can be applied to the standard brake of any Ford car at low cost without changing the original construction of the brake mechanism. The auxiliary brakes do not interfere with the usual operation of the regular brakes but operate conjointly therewith, and serve as a positive safeguard against accidents resulting from the brakes failing to hold properly.

In the accompanying drawings;

Figure 1 is a side elevation of the standard emergency brake of a Ford car having the auxiliary safety brake attached thereto;

Fig. 2 is a detail view showing the open relation of the auxiliary brake ratchet and dog;

Fig. 3 is a detail view of the auxiliary brake ratchet.

Fig. 4 is a detail view of the stationary auxiliary brake latch or dog; and

Fig. 5 is a detail view of the auxiliary brake ratchet lifting cam.

As here shown, the complete brake mechanism consists of the regular brake mechanism of a Ford car, including the stationary ratchet 2 which is riveted directly to the chassis frame 1; the brake lever 3 which is pivoted in a bracket 4 secured to the under side of the frame 1 substantially centrally between the bearing points of the ratchet 2; the ratchet latch 5 which is pivoted to the brake lever and operated by a releasing latch 6 and latch operating rod 7; and the auxiliary safety brake mechanism which consists of a floating ratchet 8 having a ratchet guard 9 which is preferably made integrally with the brake ratchet 8, the parts as a whole being pivoted in frame brackets 10 by a pivot bolt or post 11 which is slotted at its upper end, as at 12, to receive the pivot end of the part 8—9, the post being threaded at its lower end and secured to the brackets 10 by a nut 13, a spring 14 being preferably employed to draw the brake ratchet downwardly in contact with the ratchet dog 15 and ratchet lifting cam 16 to prevent rattling of the parts, the arrangement being in effect an anti-rattle feature of the mechanism.

As here shown the ratchet dog 15 and ratchet lifting cam 16 are made in the form of clamps and are secured to the brake lever 3 and latch rod 7, respectively, in the usual manner by means of clamp bolts 17 and 18 and nuts 19 and 20. Thus when the brake lever is released the free end of the ratchet 8 is raised by the action of lifting cam 16, permitting the ratchet dog 15 to move free of the ratchet until the ratchet is permitted to engage the dog in the position at which the brake is set.

The pivot post 11 replaces a bolt of like dimensions used in the regular construction in connection with the brackets 10. Thus, the entire unit of the auxiliary brake mechanism can be attached to the regular brake without any changes in the mechanism other than replacing the standard bolt with the pivot post 11, the only tools required to apply the auxiliary brake being a wrench and screw driver. Thus, the auxiliary brakes can be applied to the regular brakes in a few minutes without the assistance of a mechanic.

In this respect also the invention is an important improvement over the regular brake construction of a Ford car, as the parts in the regular construction are difficult of access and difficult to remove and replace, making an expensive maintenance cost when it is necessary to replace worn parts or otherwise repair the mechanism.

From the foregoing description the operation of the combined emergency and auxiliary safety brake will be readily understoood. The operation of the standard emergency brake when so equipped will be the same as it is without the auxiliary safety brake, but the operation of the combined brakes will be far more effective in operation than the regular emergency brake, especially with respect to accidental releasing of the brakes.

In the operation of the combined brakes when the brake lever and ratchet mechanism are operated in the usual manner, the auxiliary ratchet mechanism is also brought into simultaneous and conjoint operation and in view of the substantial construction and more effective operation of the latter mechanism the brake as a whole is made in all respects safe and dependable.

It will be observed that with the combined brakes the regular brake ratchet may be accidentally released without affecting the auxiliary safety brake, this provision being made by using a much deeper ratchet tooth and correspondingly longer ratchet dog on the auxiliary brake. By this arrangement the combination emergency and safety brake has all the effectiveness of the regular brake plus that of the safety brake, thereby greatly increasing the safeguards against accidental releasing of the brakes.

While I have here shown my improved brake used as an auxiliary safety brake, it is of course obvious that the brake may be used effectually independently of any other brake, as the mechanism, with the addition, of course, of a suitable brake lever, constitutes a complete brake mechanism in itself. Therefore, I wish to claim my invention both as a single brake mechanism used independently and also as an auxiliary safety brake used in combination with another brake.

Having thus fully described my invention, what I claim as new and desire to secure by Letters Patent, is:—

1. A combination brake mechanism comprising the regular brake mechanism of a motor vehicle and an auxiliary brake mechanism coöperating therewith, whereby operation of the regular brake mechanism will cause conjoint operation of both of said mechanisms.

2. A combination brake mechanism comprising the regular brake mechanism of a motor vehicle and an auxiliary brake mechanism coöperating therewith, whereby the releasing and setting of the regular brake mechanism will cause simultaneously therewith the releasing and setting of the auxiliary brake mechanism.

3. A combination brake mechanism comprising the regular brake mechanism of a motor vehicle and an auxiliary brake mechanism coöperating therewith, whereby accidental releasing of the regular brake mechanism may not result in releasing the auxiliary brake mechanism.

4. A combination brake mechanism comprising the regular brake mechanism of a motor vehicle and an auxiliary brake mechanism operable conjointly with the regular brake mechanism and consisting of a pivoted ratchet and a ratchet dog fixed to the brake lever, whereby the setting and releasing of said lever will cause said ratchet to engage and disengage said dog.

5. A combination brake mechanism comprising the regular brake mechanism of a motor vehicle and an auxiliary brake mechanism operable conjointly with the regular brake mechanism and consisting of a pivoted ratchet and a ratchet dog fixed to the brake lever, and a spring acting normally to hold the ratchet in engagement with said dog, whereby the setting and releasing of said lever will cause said ratchet to engage and disengage said dog and said spring will act to prevent chattering of said parts.

6. A combination brake mechanism comprising the regular brake mechanism of a motor vehicle and an auxiliary brake mechanism operable conjointly with the regular brake mechanism and consisting of a pivoted ratchet and ratchet guard formed integrally therewith, a ratchet dog secured to the brake lever and connections between the brake lever and said guard, whereby the setting and releasing of said lever will cause said ratchet to engage and disengage said dog.

7. A combination brake mechanism comprising the regular brake mechanism of a motor vehicle and an auxiliary brake mechanism operable conjointly with the regular brake mechanism and consisting of a pivoted ratchet and ratchet guard spaced apart to receive the brake lever therebetween, a dog coöperating with said ratchet and connections, whereby the setting and releasing of said lever will cause said ratchet to engage and disengage said dog.

8. A combination brake mechanism comprising the regular brake mechanism of a motor vehicle and an auxiliary brake mechanism operable conjointly with the regular brake mechanism and consisting of a pivoted ratchet and a ratchet dog detachably secured to the brake lever and other detachable connections, whereby the setting and releasing of said lever will cause said ratchet to engage and disengage said dog.

9. A combination brake mechanism comprising the regular brake mechanism of a motor vehicle and an auxiliary brake mechanism operable conjointly with the regular brake mechanism and consisting of a pivoted ratchet, a fixed dog and suitable connections detachably secured to the regular brake mechanism, whereby the setting and releasing of said lever will cause said ratchet to engage and disengage said dog.

10. A combination brake mechanism comprising the regular brake mechanism of a motor vehicle and an auxiliary brake mechanism operable conjointly with the regular brake mechanism and consisting of a ratchet, a ratchet dog and suitable connections detachably secured to the regular brake mechanism, whereby the setting and releasing of said lever will cause said ratchet to engage and disengage said dog.

11. A combination brake mechanism comprising the regular brake mechanism of a motor vehicle and an auxiliary brake mechanism operable conjointly with the regular brake mechanism and consisting of suitable ratchet mechanism coöperating with the brake lever, whereby setting and releasing of said lever will cause said ratchet mechanism to be engaged and disengaged simultaneously therewith.

12. A brake mechanism for vehicles comprising a pivoted brake lever, a pivoted ratchet and a fixed dog coöperating with said lever, and connections carried by the lever, whereby said ratchet may be caused to engage and disengage said dog and the brake lever may be shifted.

13. A brake mechanism for vehicles comprising a pivoted brake lever, a pivoted ratchet and ratchet guard spaced apart to receive the brake lever therebetween, and a ratchet dog fixed on the brake lever and connections carried by the lever, whereby said ratchet may be caused to engage and disengage said dog and the brake lever may be shifted.

14. A brake mechanism for vehicles comprising a pivoted brake lever, a pivoted ratchet and ratchet guard spaced apart to receive the brake lever therebetween, and a ratchet dog fixed on the brake lever and connections carried by the lever, whereby said ratchet may be caused to engage and disengage said dog and the brake lever may be shifted, and a spring acting to yieldingly hold the ratchet in engagement with said dog thereby to prevent chattering of said parts.

In testimony whereof I affix my signature.

EARL W. URTON.